(12) United States Patent
Hutchings et al.

(10) Patent No.: US 8,435,482 B2
(45) Date of Patent: May 7, 2013

(54) MIXED-METAL OXIDES PRECIPITATED WITH SUPERCRITICAL $CO_2$

(75) Inventors: Graham John Hutchings, Ross on Wye (GB); Stuart Hamilton Taylor, Cardiff (GB); Jonathan Keith Bartley, Cardiff (GB)

(73) Assignee: University College Cardiff Consultants Ltd, Cardiff, South Glamorgan (GB)

(*) Notice: Subject to any disclaimer, the term of this patent is extended or adjusted under 35 U.S.C. 154(b) by 677 days.

(21) Appl. No.: 12/095,664

(22) PCT Filed: Dec. 1, 2006

(86) PCT No.: PCT/GB2006/004489
§ 371 (c)(1), (2), (4) Date: May 25, 2010

(87) PCT Pub. No.: WO2007/063321
PCT Pub. Date: Jun. 7, 2007

(65) Prior Publication Data
US 2010/0226845 A1   Sep. 9, 2010

(30) Foreign Application Priority Data

Dec. 1, 2005 (GB) ................................. 0524541.0
May 24, 2006 (GB) ................................. 0610341.0

(51) Int. Cl.
*C01B 13/00* (2006.01)
*C01C 1/00* (2006.01)
*C01D 1/02* (2006.01)
*C01G 45/12* (2006.01)
*B01J 23/00* (2006.01)
*B01J 23/32* (2006.01)

(52) U.S. Cl.
USPC ........ 423/593.1; 423/599; 502/300; 502/318; 502/324

(58) Field of Classification Search .. 423/593.1–594.16; 502/235–355
See application file for complete search history.

(56) References Cited

U.S. PATENT DOCUMENTS 4,970,093 A * 11/1990 Sievers et al. ................. 427/575
5,652,192 A * 7/1997 Matson et al. ................ 502/304
(Continued)

FOREIGN PATENT DOCUMENTS

EP   1 531 001 A    5/2005
EP   1 717 263 A   11/2006
(Continued)

OTHER PUBLICATIONS

Reverchon, Ernesto, "Supercritical antisolvent precipitation of micro- and nano-particles", Journal of Supercritical Fluids 15 (1999) 1-21.*

(Continued)

*Primary Examiner* — Anthony J Zimmer
(74) *Attorney, Agent, or Firm* — Miles & Stockbridge P.C.; David R. Schaffer, Esq.

(57) ABSTRACT

Hopcalite-type catalysts for oxidation of CO are formed by preparing a mixed-metal oxide precursor by firstly preparing a solution of a mixture of metal precursor compounds in a solvent, followed by contacting the solution with a supercritical antisolvent to precipitate the mixed-metal oxide precursor. A mixed-metal oxide may then be prepared from the precursor by oxidation, for example by calcination. The mixed-metal oxide is then collected and optionally activated for use as a catalyst. The activated or calcined catalyst contains a nano-structured mixed-phase composition comprising phase-separated intimately mixed nanoparticles of copper and manganese oxide.

10 Claims, 17 Drawing Sheets

U.S. PATENT DOCUMENTS

| | | | |
|---|---|---|---|
| 6,387,341 B1 * | 5/2002 | Sarrade et al. | 423/335 |
| 2005/0209095 A1 * | 9/2005 | Brown | 502/150 |
| 2005/0241478 A1 | 11/2005 | Junicke et al. | |

FOREIGN PATENT DOCUMENTS

| | | |
|---|---|---|
| FR | 2 763 258 A1 | 11/1998 |
| KR | 523960 B * | 10/2005 |
| WO | WO 2005/073285 A1 | 8/2005 |
| WO | WO 2005/118133 A2 | 12/2005 |

OTHER PUBLICATIONS

Adschiri et al., "Hydrothermal Synthesis of Metal Oxide Fine Particles at Supercritical Conditions", Ind. Eng. Chem. Res. 2000, 39, 4901-4907.*

Adschiri et al., "Hydrothermal Synthesis of Metal Oxide Fine Particles at Supercrtical conditions", Ind. Eng. Chem. Res. 2000, 39, 4901-4907.*

Hertz et al., "Synthesis and encapsulation of yttria stabilized zirconia particles in supercritical carbon dioxide", Journal of the European Ceramic Society 26 (2006) 1195-1203, Available online Feb. 23, 2005.*

Jung et al., "Review: Particle design using supercritical fluids: Literature and patent survey", Journal of Supercritical Fluids 20 (2001) 179-219.*

International Application No. PCT/GB2006/004489—International Search Report and Written Opinion of the International Searching Authority.

* cited by examiner (a)

(b)

(c)

Legend: catalyst prepared using supercritical antisolvent preparation ■; conventional hopcalite prepared by coprecipitation △; commercial hopcalite ●; precursor from supercritial antisolvent preparation ◇.

(a) 0% H₂O (b) 5% H₂O (c) 10% H₂O (d) 15% H₂O b-2h b-20h c-2h c-20h

MIXED-METAL OXIDES PRECIPITATED WITH SUPERCRITICAL $CO_2$

FIELD OF THE INVENTION

This invention relates to mixed-metal oxides particularly, but not exclusively, nanocrystalline oxides, more particularly, copper-manganese oxides, the precipitation of such oxides using supercritical precipitation, the preparation of catalysts using the oxides as precursors, the use of such catalysts in oxidation reactions and the oxidation products obtained from such oxidation reactions.

BACKGROUND TO THE INVENTION

One of the most important catalysts in common usage today is hopcalite, a mixed oxide of copper and manganese that is used as the catalyst of choice for the oxidation of carbon monoxide in breathing apparatus in both military and civil applications. Hopcalite catalysts are also used in other applications, for example removal of ozone from various off-gas emissions by conversion to oxygen and removal of volatile organic compounds from, for example, fuel cell feedstocks.

It is generally recognized that active hopcalite catalysts are prepared by coprecipitation of a basic carbonate from a solution of the nitrates, and that the best catalysts are derived from amorphous precursors. However, as with all catalysts that are in current commercial usage, there is a need to improve the formulation to achieve improved activity so that the catalyst lifetime can be extended, which is particularly important for hopcalite since it is used in breathing apparatus, smoke hoods and other personal protection applications.

In recent years there has been extensive interest in the use of supercritical fluids as antisolvents for precipitation. The particular advantage of this technique is that it permits much higher diffusivities, up to two orders of magnitude greater, when compared with non-supercritical solvents. This fast diffusion can produce supersaturation immediately prior to precipitation and thus leads to the formation of very small particles not accessible by standard catalyst preparation methods.

To date, there has been significant interest in the use of supercritical antisolvent precipitation for the preparation of micro- and nano-particles and the technique has been used to synthesize a range of materials including: polymers, explosives, pharmaceutical chemicals, superconductors and some catalysts. With respect to catalysts the method has been used to prepare a range of single oxides that can be used as either the active phase or as a support material. However, there have been no reports of the method being used to successfully prepare mixed-metal oxides for use as catalysts, as phase separation was thought to be a problem.

Mixed-metal oxides make up, by far, the greatest number of catalysts or catalyst precursors currently used today and it is, therefore, desirable to find a method to prepare mixed-metal oxide catalysts by supercritical antisolvent precipitation.

DISCLOSURE OF THE INVENTION

According to one aspect of the present invention there is provided a method of preparing a mixed-metal oxide precursor comprising the steps:

1. preparing a solution of a mixture of metal precursor compounds in a solvent and
2. contacting the solution with a supercritical antisolvent to precipitate the mixed-metal oxide precursor.

A mixed-metal oxide may then be prepared from the precursor by oxidation, for example by calcination.

The method may further comprise the steps of:

3. collecting the precipitated mixed-metal oxide and, optionally,
4. activating the mixed-metal oxide for use as a catalyst.

Preferably the mixture of metal precursor compounds comprises a mixture of salts of the metals with the same counter-ion, for example acetate, and the mixed-metal oxide is activated by heating in a gas mixture or by hydrothermal treatment. The mixed-metal oxide precursor is generally, and unusually, a homogeneous mixture.

The method of preparing a mixed-metal oxide according to the invention provides an oxide which brings the active components together without requiring them to be present in the same phase. Such an oxide can itself be used as a precursor to provide a catalyst with a high catalytic activity, that is, about twice as high compared with conventionally prepared catalysts.

A supercritical fluid is a compound at a temperature and pressure above its thermodynamic critical point, where the densities of the liquid and gaseous phases are the same and the compound has the ability to diffuse through solids as though it was a gas and yet to dissolve materials as though it was a liquid.

The method of the present invention takes advantage of the poor solubility of certain metal oxide precursors in supercritical fluids in order to precipitate those same metal oxide precursors from solution. The supercritical fluids thereby act as an antisolvent.

As described herein, antisolvent precipitation comprises precipitation from a solvent using a supercritical antisolvent. The supercritical antisolvent may comprise any fluid in a supercritical phase capable of precipitating the mixed-metal oxide precursor from solution. In order to be capable of precipitating the mixed-metal oxide precursor from solution, the mixed-metal oxide precursor should be insoluble in the antisolvent, the solvent should be miscible with the antisolvent, and the antisolvent should be chemically inert towards all other components of the reaction. At ambient conditions the antisolvent should not leave any residues in the precipitate, because this may affect the structure of the precursor and the resulting mixed-metal oxide following oxidation. Preferably, the supercritical antisolvent comprises $CO_2$, methane, ethane, propane or n-butane; most preferably $CO_2$.

The solvent preferably comprises a polar solvent such as DMF, DMSO or an alcohol, optionally including water.

As used herein, the term "mixed-metal oxide" includes any compound (including covalent and ionic compounds) comprising at least two different metal atoms and at least one oxygen atom. This term includes compounds consisting exclusively of metal and oxygen atoms, as well as compounds additionally containing one or more atoms selected from hydrogen, sulphur, carbon and nitrogen. As used herein, the term "metal" includes alkali metals, alkaline earth metals, transition metals, lanthanides, actinides and Group III elements. Preferably, the mixed-metal oxide comprises iron, molybdenum, nickel, cobalt, copper and manganese. More preferably, the mixed-metal oxide comprises copper and manganese.

According to a preferred aspect of the present invention there is provided a method of preparing copper-manganese oxide precursor comprising the steps:

a) preparing a solution of a copper and manganese precursor in a solvent and b) contacting the solution with a supercritical antisolvent to precipitate copper-manganese oxide precursor.

The method may optionally include the further steps of:

c) oxidation of the copper-manganese oxide precursor;
d) collecting the precipitated copper-manganese oxide precursor; and
e) activating the copper-manganese oxide for use as a catalyst, although the oxide as prepared direct from the precursor may exhibit inherent catalytic activity.

Suitable mixed-metal precursors include acetates, formates, citrates, nitrates, chlorides and other salts.

Preferably the copper-manganese precursor is copper-manganese acetate.

The precursor may exist as amorphous compositionally homogeneous nanocrystals of the mixed salts, preferably acetates, together with optionally some basic carbonate salts derived from exposure to atmospheric $CO_2$. However, addition of water to the solvent may promote the formation of precursors containing crystalline carbonates which, on calcination, yield mixed oxides with higher surface areas than oxides prepared from precursors themselves prepared from solvents containing no additional water, following calcination, and provide superior catalytic activity. Water may advantageously be added up to a concentration of 20% of total solvent, preferably 5 to 15%.

Preferably the copper-manganese oxide precursor is oxidized by calcination and may further be activated by heating in a gas mixture.

The oxide can be collected in various ways. One way is to cause depressurisation to allow a precipitate to form and then filtering to collect the oxide.

In another aspect of the invention there is provided a mixed-metal oxide prepared by a method according to the invention.

Preferably the mixed-metal oxide precursor and the oxide formed therefrom is nano-crystalline and/or formed as uniform particles.

The mixed-metal oxide comprises metal and oxygen atoms and may comprise further atoms selected from hydrogen, sulphur, carbon and nitrogen.

The mixed-metal oxide may be copper-manganese oxide, preferably having crystallites in the range of 10-20 nm in diameter.

In a further aspect of the invention there is provided a catalyst prepared by a method according to the invention.

The catalyst may be activated by heating in a gas mixture or by hydrothermal treatment. Preferably, the catalyst is activated by calcination. The calcination may be carried out at a temperature of between 250 to 500° C., preferably at about 300° C.

The catalyst may be on oxidation catalyst. Preferably, the catalyst is used for the oxidation of carbon monoxide, especially for the oxidation of carbon monoxide in breathing apparatus. The catalyst may be a copper-manganese catalyst, preferably hopcalite, and preferably has a nano-structure.

Catalysts according to the invention optionally include a precious metal at a concentration of up to 10% by weight, preferably up to 5% by weight, to enhance the catalytic activity, especially for removal of volatile organic compounds at ambient or reduced temperatures compared with elevated temperatures conventionally required. Depending on the oxidation reaction, gold or platinum may be especially advantageous.

In yet further aspects of the present invention, there are provided a catalytic method of oxidizing carbon monoxide with a catalyst according to the invention and breathing apparatus incorporating a catalyst according to the invention for the oxidation of carbon monoxide.

In yet another aspect the present invention provides a nanostructured mixed-phase catalyst based on a hopcalite composition (a mixed oxide of copper and manganese), prepared by use of compressed supercritical carbon dioxide (hereinafter referred to as "scCO$_2$") as the antisolvent, and the catalyst may be employed for the oxidation of carbon monoxide at ambient temperature. In particular, the use of this methodology enables a catalyst precursor to be prepared comprising homogeneous mixtures of $Cu^{2+}$ and $Mn^{3+}$ with crystallites in the range of 10-20 nm in diameter. This material, following activation by heating in air, is found to be more than twice as active as conventionally prepared hopcalite catalysts for the oxidation of carbon monoxide. The catalyst comprises phase-separated intimately mixed nanoparticles of copper and manganese oxide.

In summary, the invention provides a new nanocrystalline mixed metal, especially copper manganese, oxide catalyst using a precipitation method with supercritical carbon dioxide as an antisolvent to give a precursor in which the components are well mixed. The preliminary catalytic data show the intrinsic activity for CO oxidation of the catalyst derived from this precursor is considerably higher compared to the conventional $CuMn_2O_4$ catalysts prepared by coprecipitation and also currently available commercial catalysts. The generation of amorphous but compositionally homogeneous 10-20 nm mixed metal precursors leads to the crystallization of phase separated systems which remain compositionally intimately mixed on the nanometer length scale due to the absence of significant particle growth accompanying the phase separation.

BRIEF DESCRIPTION OF THE DRAWINGS

Methods and catalysts in accordance with the invention will now be described, by way of example only, with reference to the accompanying drawings FIGS. 1 to 18 in which.

Figure 10:
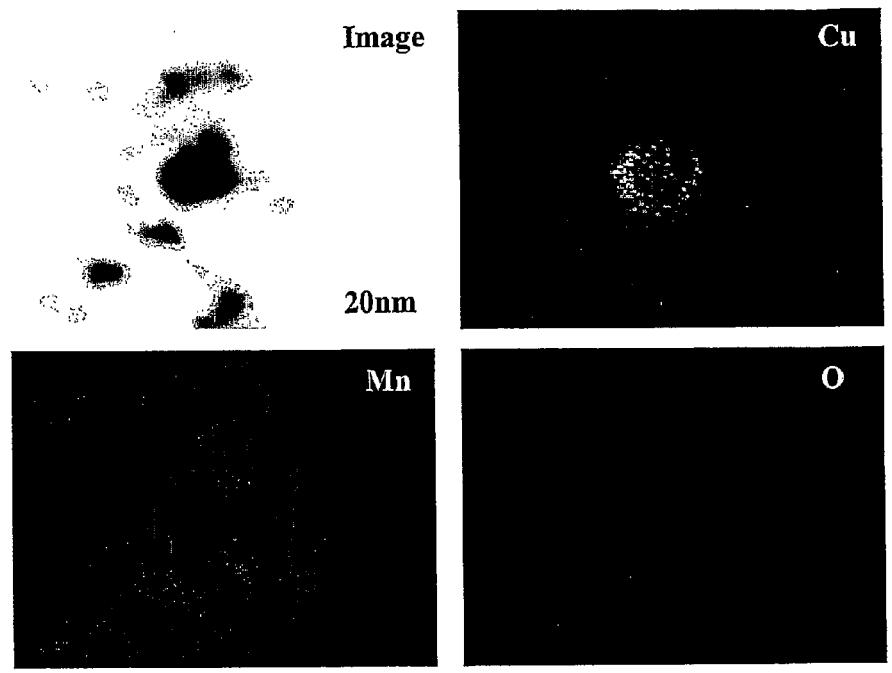
Figure 11:
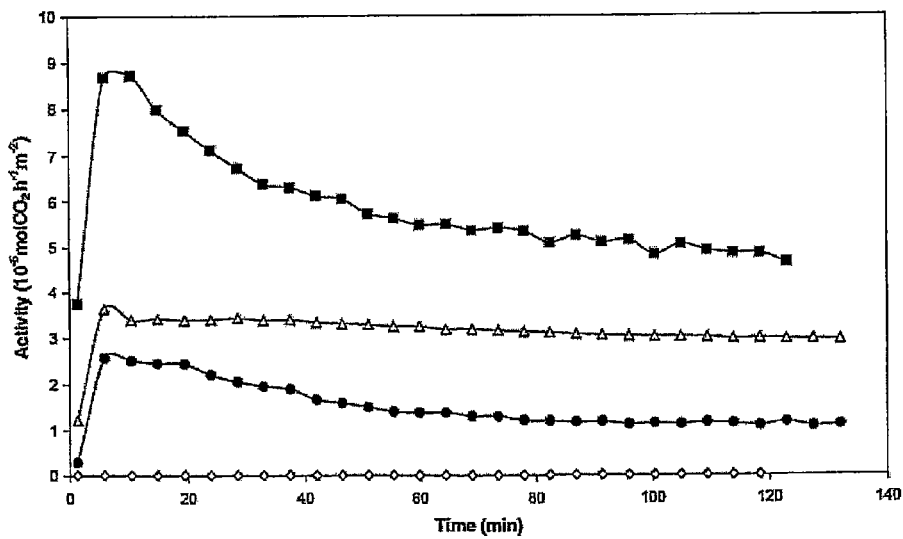
Figure 12:
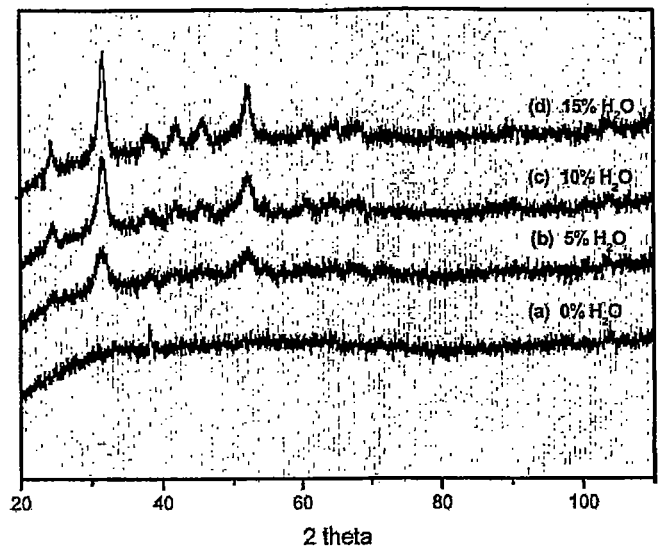
Figure 13:
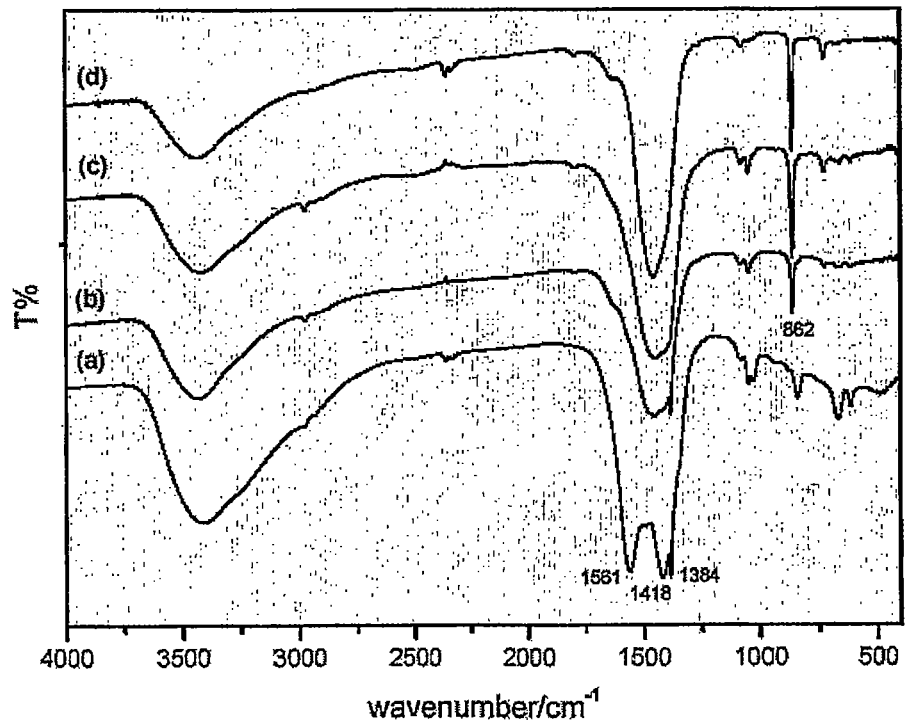
Figure 14:
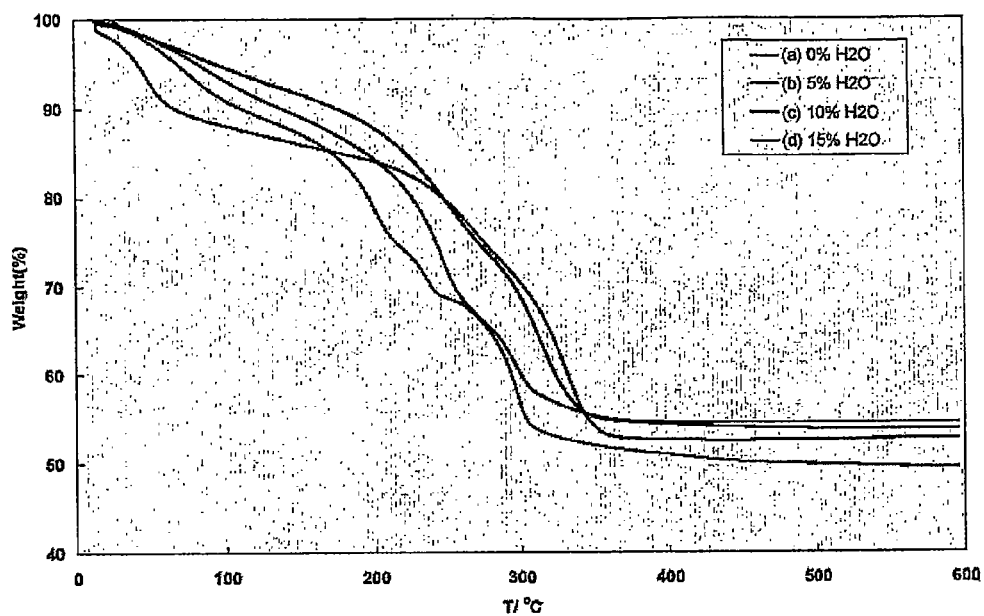
Figure 15:
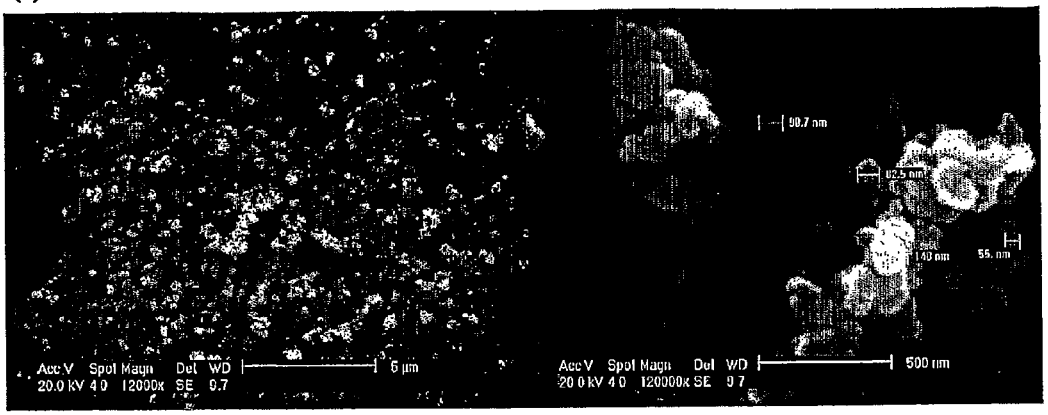
Figure 15:
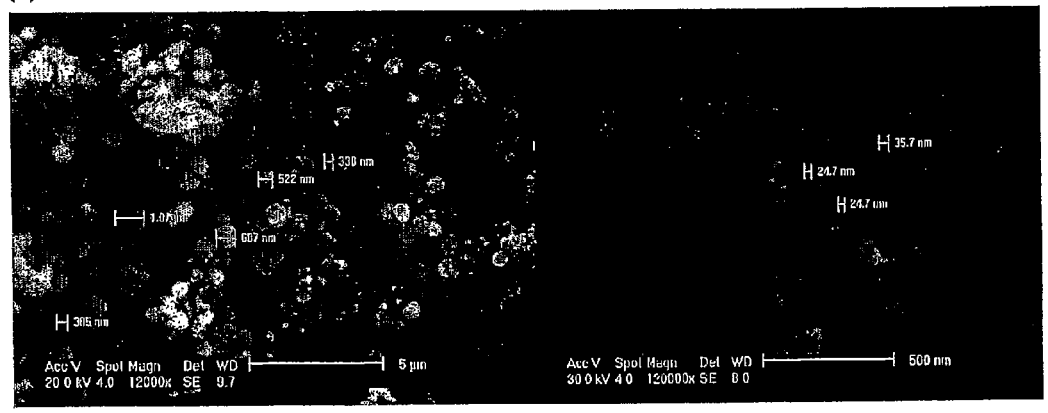
Figure 15:
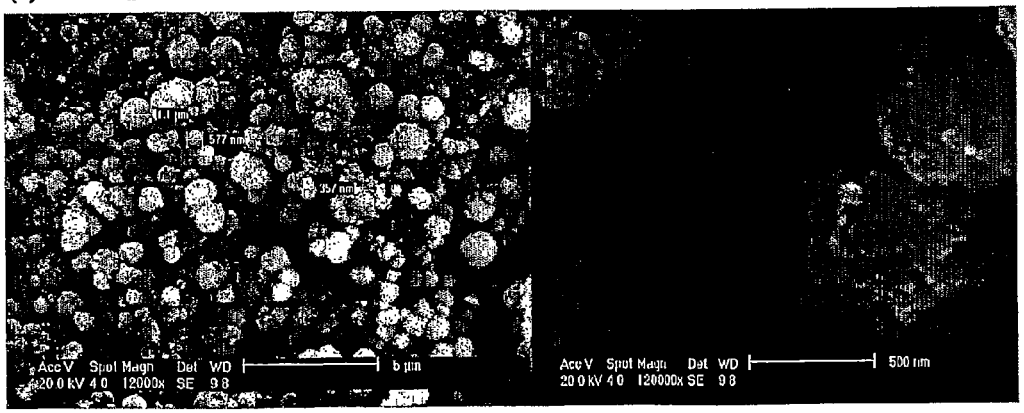
Figure 15:
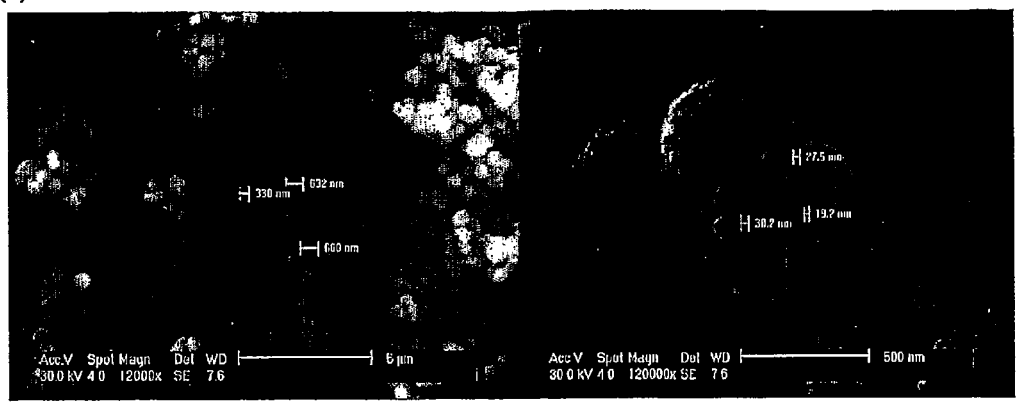
Figure 16:
Figure 17:
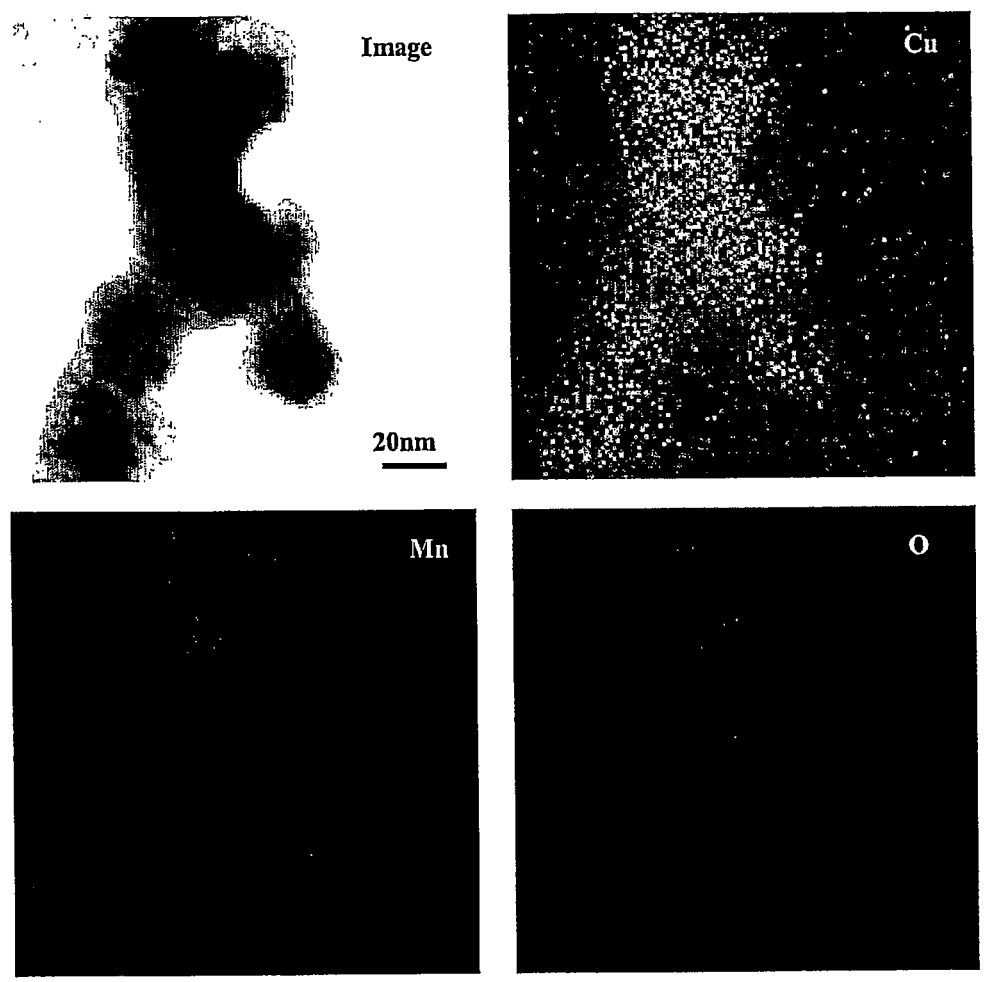
Figure 18:
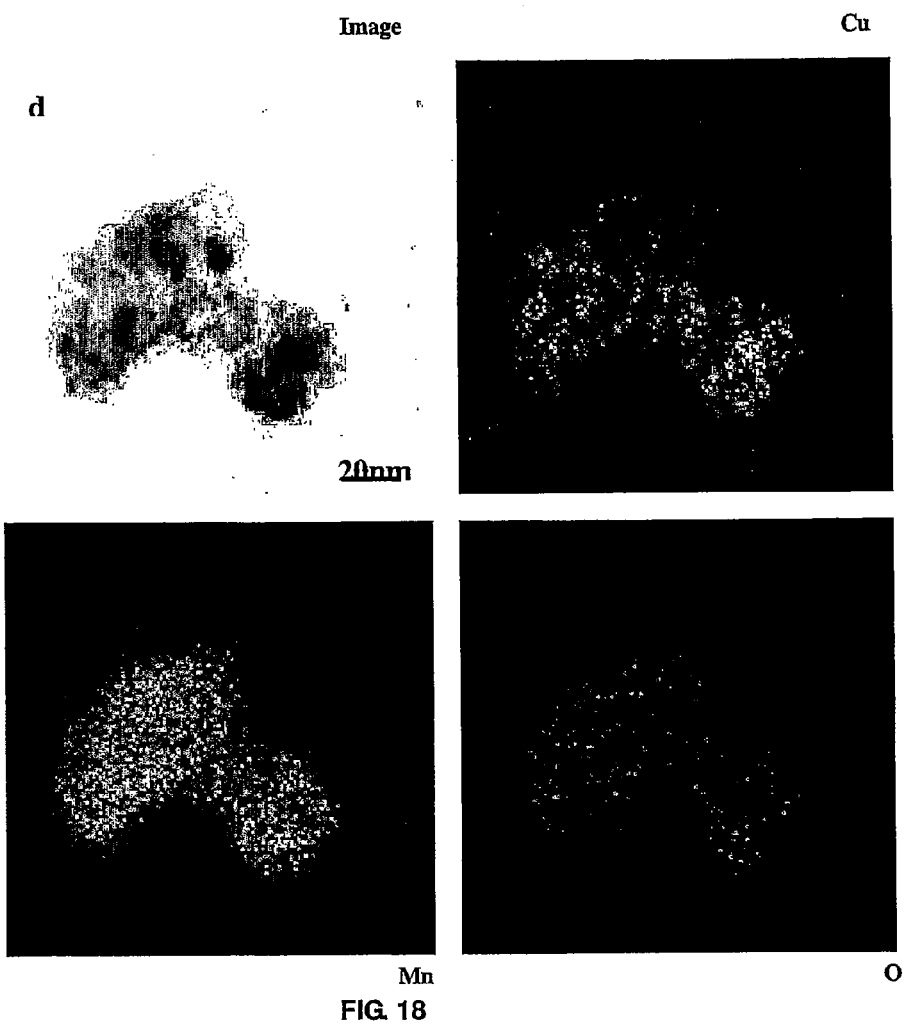
Figure 19:
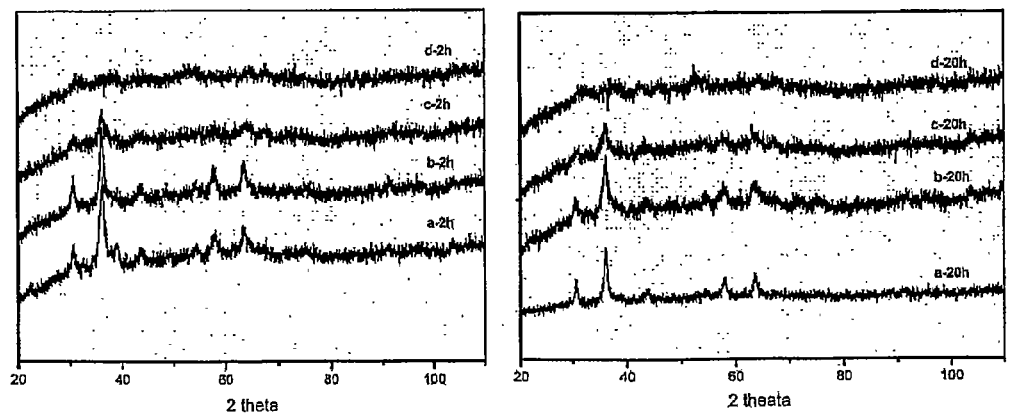
Figure 20:
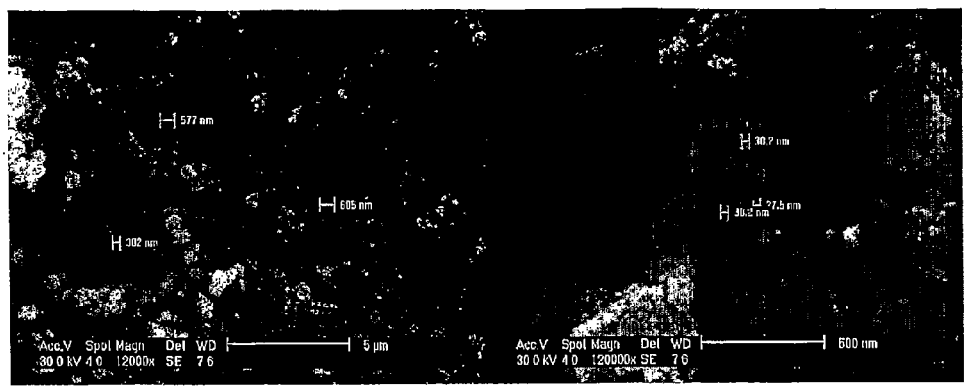
Figure 20:
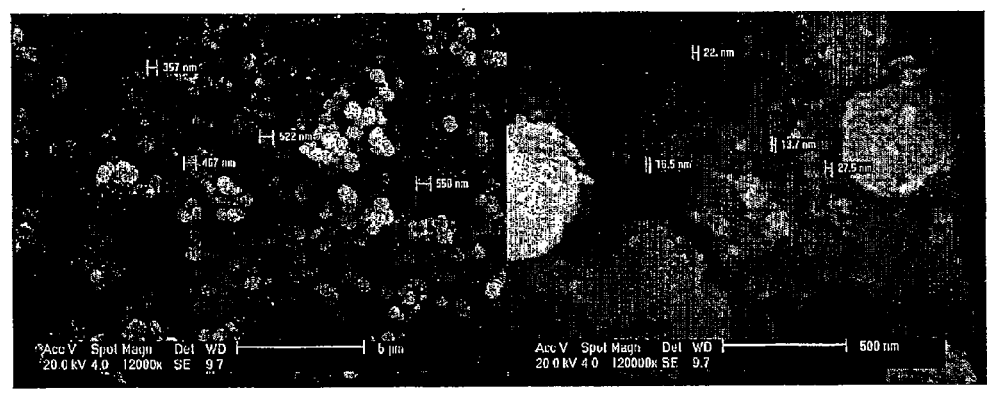
Figure 20:
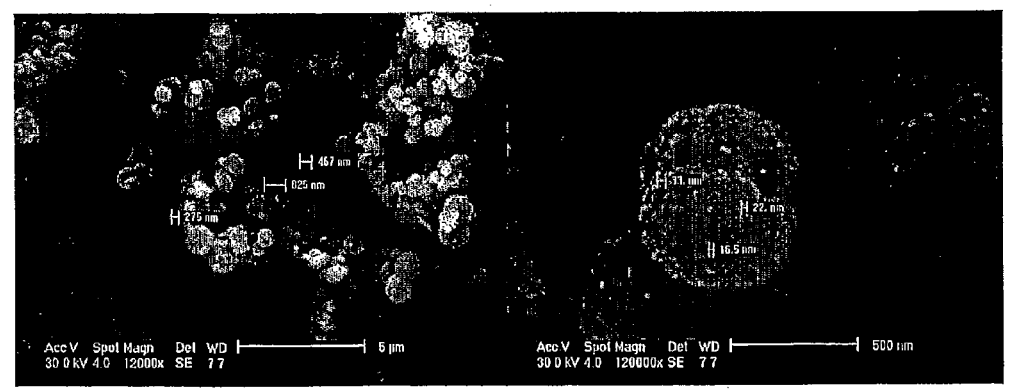
Figure 20:
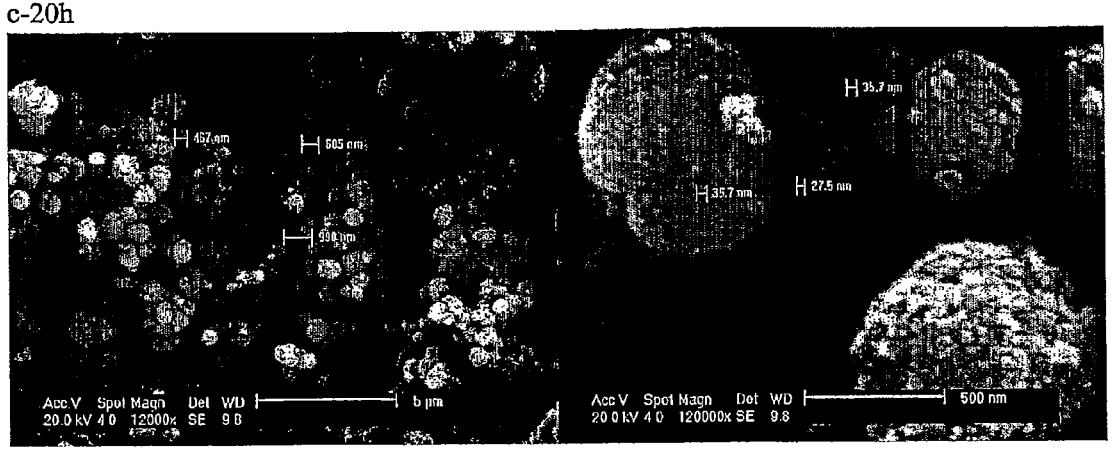
Figure 21:
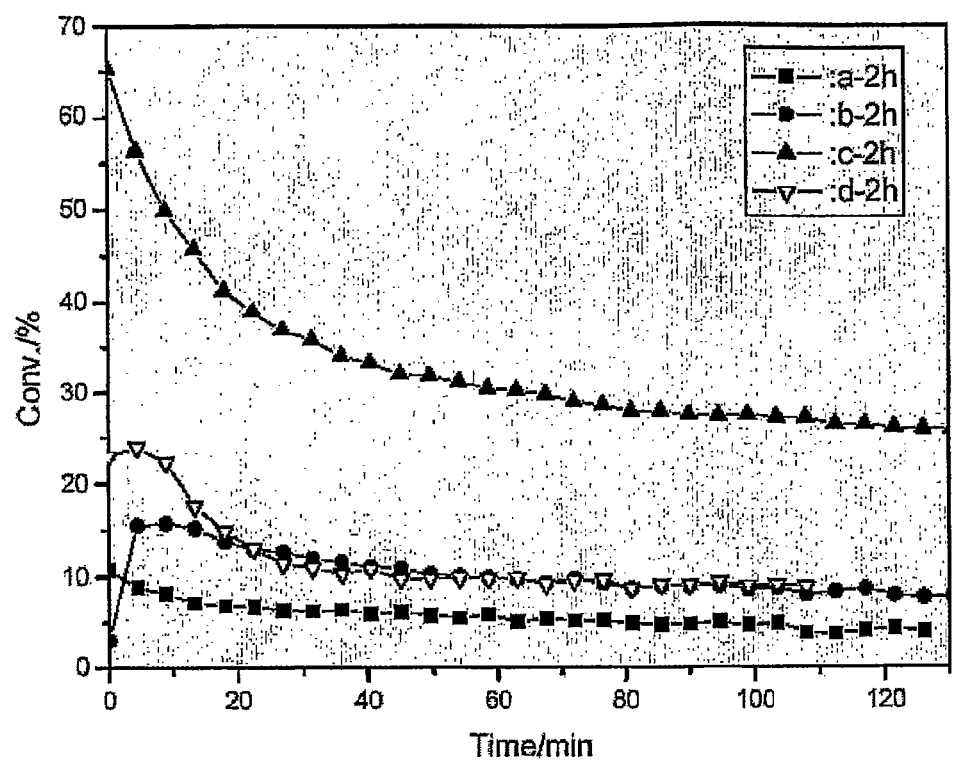
Figure 21:
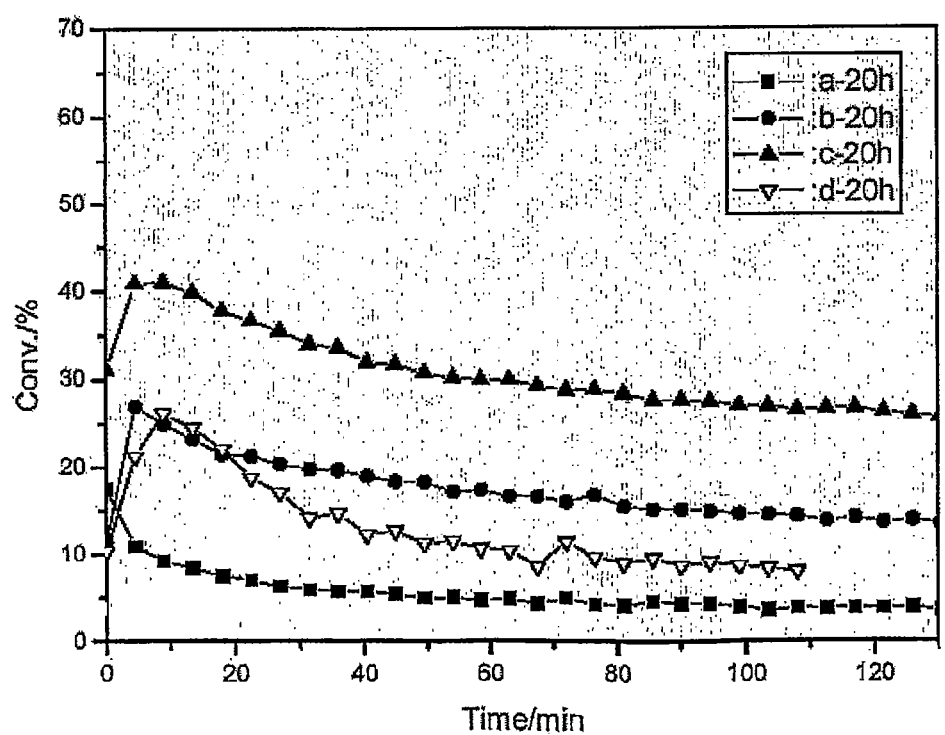
Figure 22:
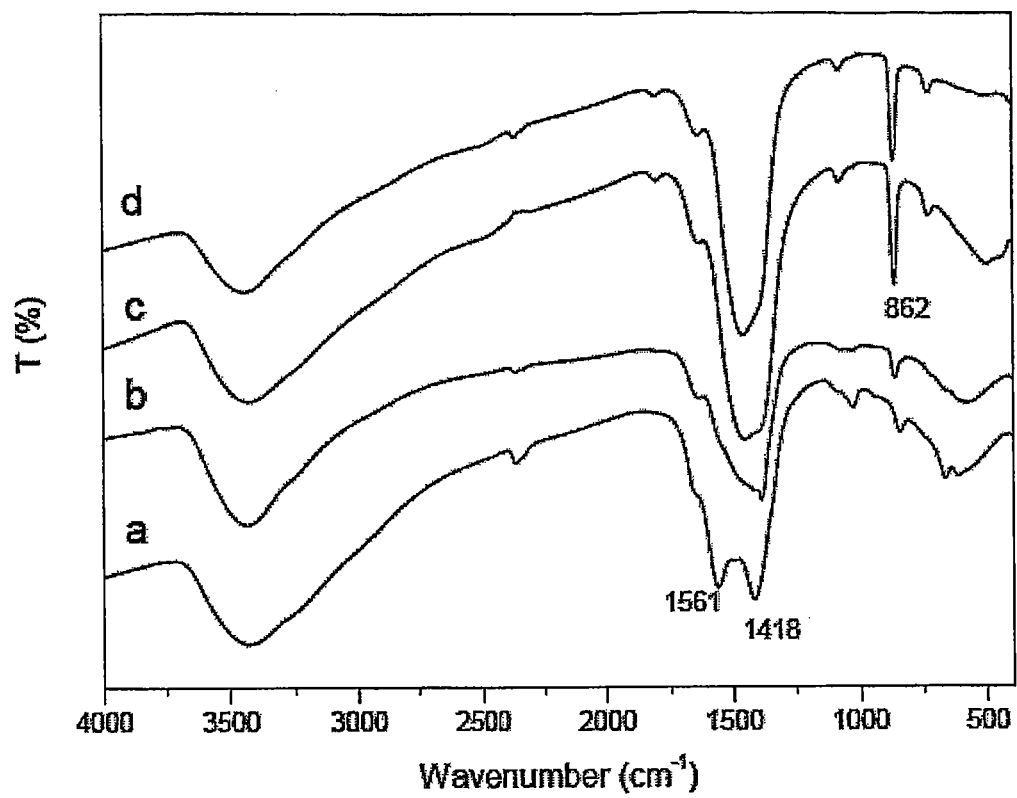

(b) shows the lattice images for Cu particles in HR-TEM;

(c) shows the lattice images for MnO$_x$ particles in HR-TEM;

FIG. 10 shows a STEM dark field image of nanoparticles from the 300° C. calcined material the element distribution across this area being mapped by EDX and the different maps shown corresponding to Mn (b), Cu (c) and O (d) edges;

FIG. 11 shows catalytic activity of catalysts according to the invention, prepared using DMSO, in comparison with commercial catalysts currently available;

FIG. 12 shows the XRD data on compounds prepared from ethanol/water solvents;

FIG. 13 shows IR spectra for the compounds of FIG. 12;

FIG. 14 shows TGA results for the compounds of FIG. 12;

FIG. 15 shows SEM images of the compounds of FIG. 12;

FIG. 16 shows a TEM image of Cu/MnO$_x$ precursor prepared using ethanol/water (90/10) as solvent;

FIG. 17 shows STEM dark field images of nanoparticles from the precursor material prepared using ethanol (90%)-water (10%) as solvent, the element distribution across this area being mapped by EDX and the different maps corresponding to Cu, Mn and O edges;

FIG. 18 shows STEM dark field images of nanoparticles from the 300° C. calcined material prepared from the precursor material of FIG. 17;

FIG. 19 shows XRD data for catalysts prepared from the compounds of FIG. 12;

FIG. 20 shows SEM images of selected catalysts of FIG. 19, calcined either for 2 hours or 20 hours;

FIG. 21 shows catalytic activity of the catalysts of FIG. 19 in oxidation of carbon monoxide;

FIG. 22 shows IR spectra for compounds prepared from DMF/water solvents; and

Figure 23:
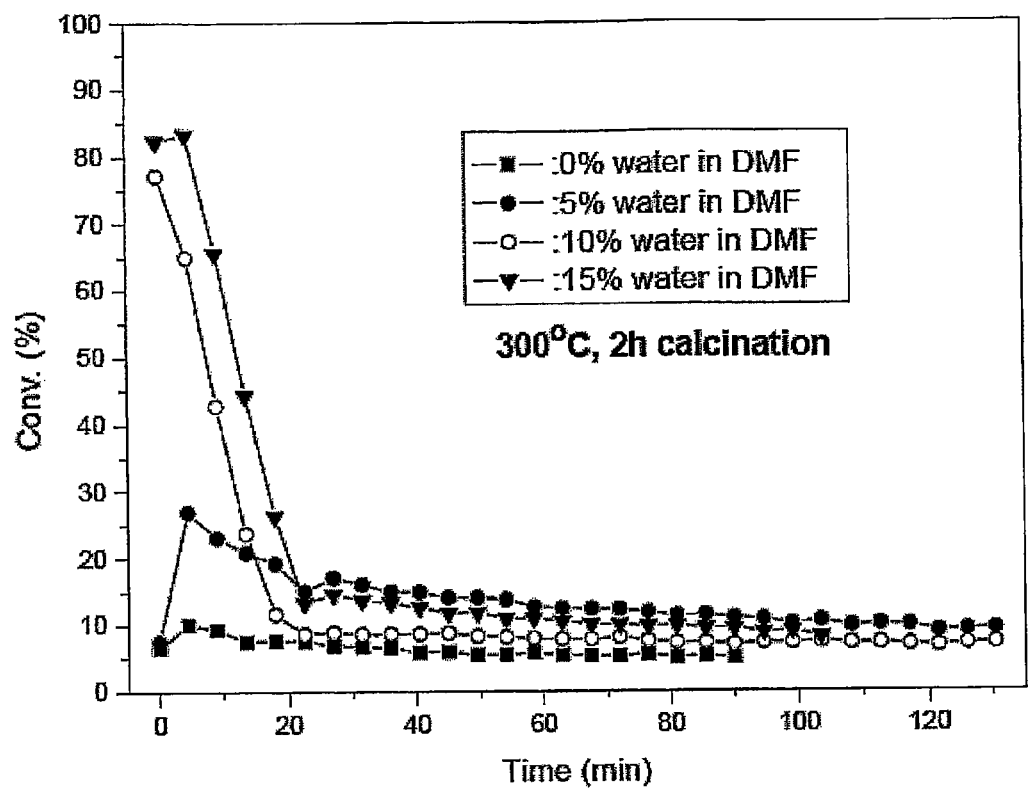
Figure 23:
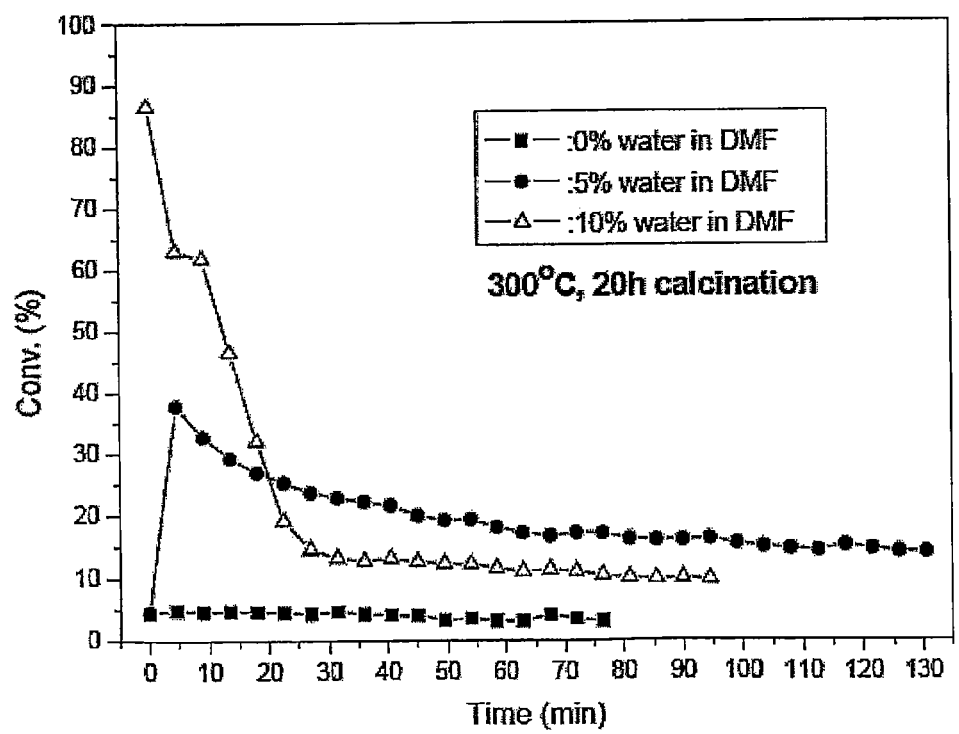

FIG. 23 shows catalytic activity of the catalysts of FIG. 22 in oxidation of carbon monoxide.

DETAILED DESCRIPTION

Preparation of Catalyst Precursors

Figure 1:
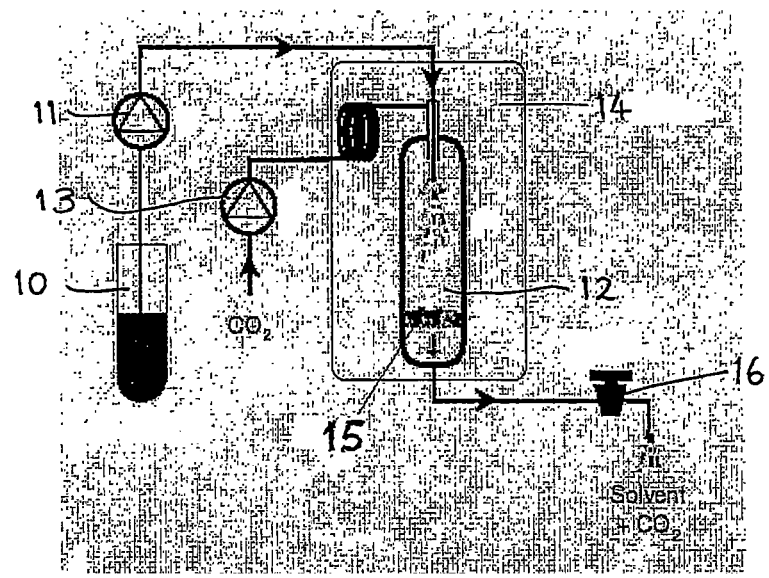
FIG. 1 is a schematic illustration of the apparatus for the precipitation of the CuMnO$_x$ precursors using the antisolvent precipitation process.

The synthesis of catalyst precursors, CuMn$_2$O$_4$, was carried out in a purpose built reactor shown in FIG. 1. A mixed solution of copper acetate (Cu$^{2+}$) (0.005 mol, Aldrich) and manganese acetate (Mn$^{2+}$) (0.01 mol, Aldrich) in dimethyl sulfoxide (DMSO) (100 ml, Aldrich) was prepared and held in supply vessel 10, for pumping to precipitation vessel 12 by HPLC pump 11. Supercritical CO$_2$ was pumped by pump 13 at pressures of up to 110 bar with a flow rate of 10 ml min$^{-1}$. The precipitation vessel system was held at 40° C. in a GC oven 14. Initially, pure solvent was pumped through a fine capillary into the precipitation vessel 12 at a flow rate around 0.1 ml min$^{-1}$ for 25 min in co-current mode with supercritical CO$_2$ in order to obtain steady-state conditions in the vessel. After the initial period, the flow of the liquid solvent was stopped and the mixed acetate solution was delivered from supply vessel 10 at 0.1 ml min$^{-1}$ flow rate as droplets. The system pressure and temperature were maintained constant during the course of feeding the solution and CO$_2$. As the solution exited the capillary, the droplet and scCO$_2$ rapidly diffused into each other, causing expansion, simultaneously reducing the solvent power. The solute was precipitated rapidly and collected on filter 15. When all the solution had been processed, scCO$_2$ was pumped for a further hour through back pressure regulator 16 to wash the vessel in case residual DMSO condensed during the depressurization and partly solubilised the precipitated powder, modifying its morphology. When the washing process was completed, the CO$_2$ flow rate was stopped and the vessel was depressurized to atmospheric pressure and the light green precipitate was collected. Experiments were conducted for 6 h, which resulted in the synthesis of approximately 0.5 g of solid.

Structure of the Catalyst Precursor

Figure 2:
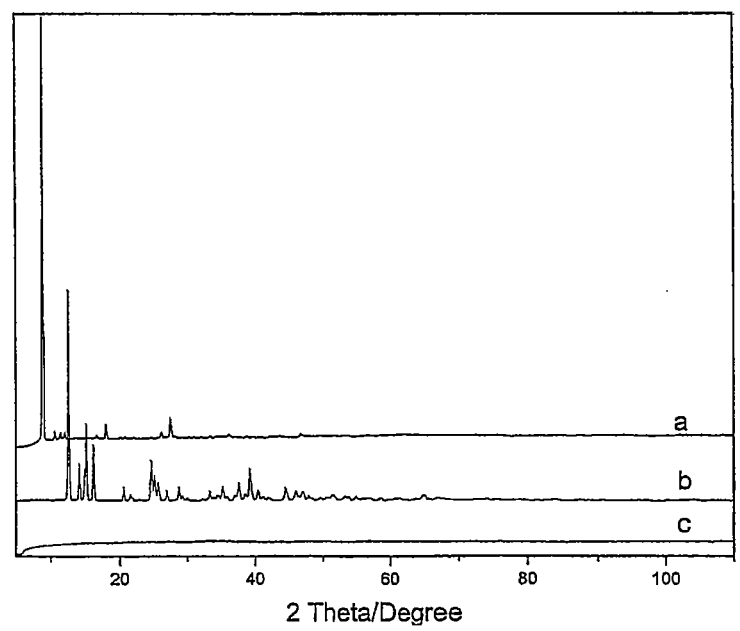
FIG. 2 shows XRD patterns of untreated manganese acetate (a), copper acetate (b) and Cu/MnO$_x$ precursor from a supercritical process (c), using DMSO as solvent.
Figure 3:
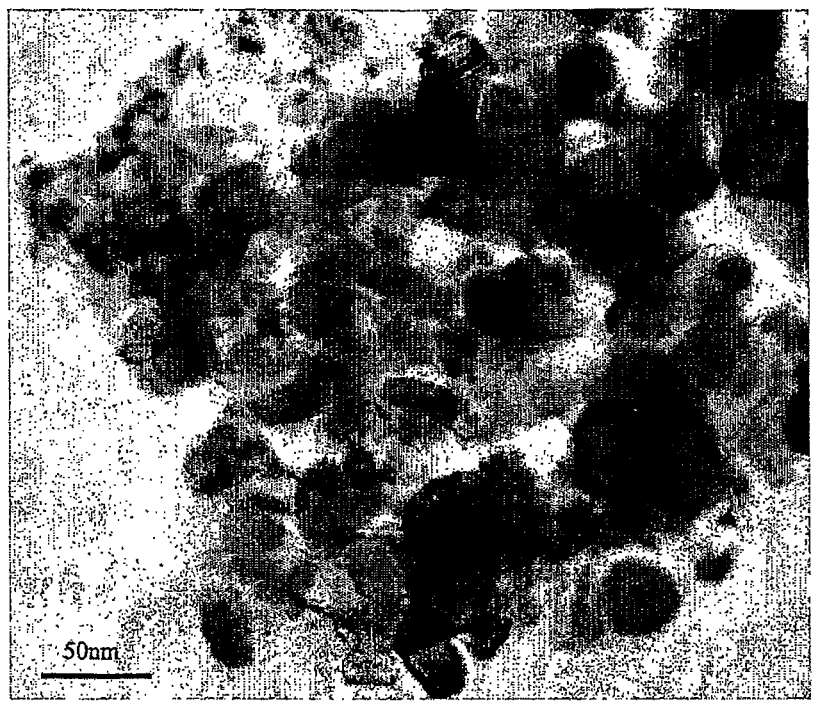
FIG. 3 shows a TEM image of the Cu/MnO$_x$ precursor of FIG. 2(c)
Figure 4:
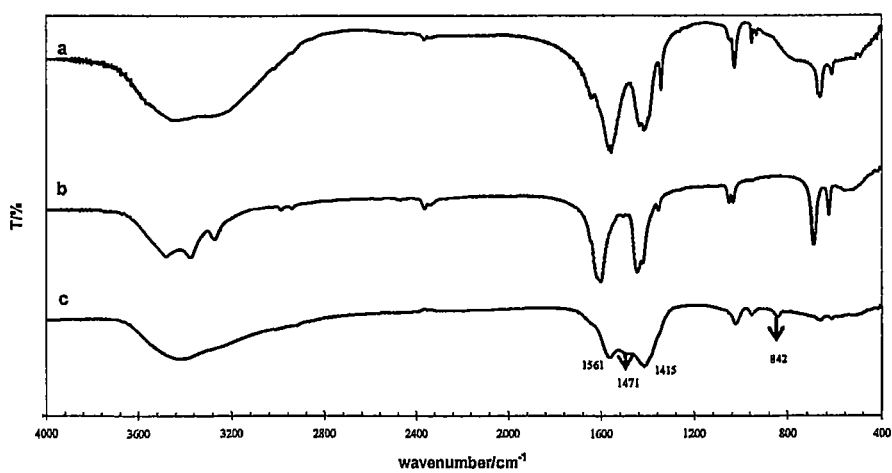
FIG. 4 shows an FT-IR spectra of untreated manganese acetate (a), copper acetate (b) and the Cu/MnO$_x$ precursor of FIG. 2(c)
Figure 5:
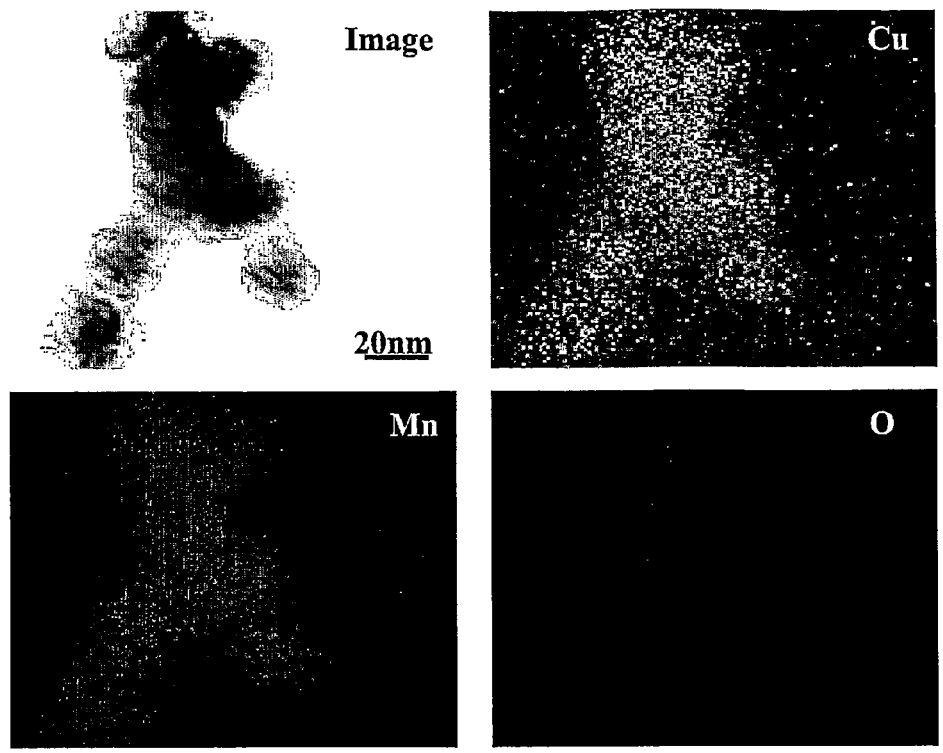
FIG. 5 shows a STEM dark field image of nanoparticles from the precursor material prepared using DMSO as solvent, the element distribution across this area being mapped by EDX and the different maps shown corresponding to Mn (b), Cu (c) and O (d) edges.

The light green solid product collected from the process was completely amorphous by powder X-ray diffraction as shown in FIG. 2. The TEM images of the precursor, FIG. 3, reveal very little contrast, consistent with the lack of crystalline order. BET surface area measurement shows that precursors made using this process exhibit exceptionally high surface area up to ca. 300 m$^2$ g$^{-1}$. The ratio of [Cu]:[Mn] in the precursors prepared was found to be 0.51 indicating that the copper acetate and the manganese acetate are precipitated stoichiometrically. The FT-IR spectrum of the precursors shows the bands of the acetate salts as shown in FIG. 4, with main bands at 1561 and 1415 cm$^{-1}$, corresponding to the asymmetric and symmetric stretching of carboxyl groups respectively. There are also bands observed at 1471 cm$^{-1}$ as a shoulder and at 842 cm$^{-1}$ which may be attributed to the presence of basic carbonate salts. A TEM examination of the precursor, FIG. 3, showed that the material has slightly aggregated quasi-spherical non-faceted particles of relatively uniform size and dimensions that are small in comparison with those afforded by other precipitation routes (10-20 nm with some particles as large as 50 nm). The elemental distribution within the precursor particle assemblage is highly homogeneous even when probed with the high spatial resolution of the STEM as shown in FIG. 5—there is nanoscale intermixing of Cu, Mn and O within the precursor although even the STEM cannot resolve individual particles within these highly aggregated assemblies. Hence, based on the analysis, we conclude that the precursor comprises amorphous compositionally homogeneous nanocrystals of mixed copper and manganese acetates together with some basic carbonate salts due to the exposure of the material to the CO$_2$ atmosphere.

Preparation of Catalyst from Precursors

Figure 6:
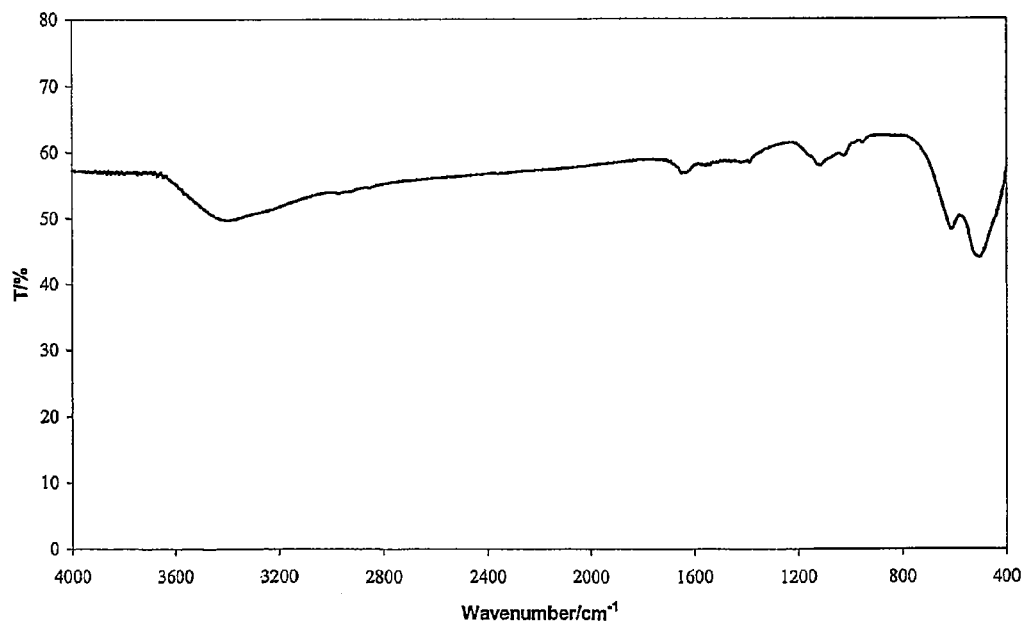
FIG. 6 shows an FT-IR spectrum of the final catalyst (calcined at 300° C.)

A series of copper manganese oxide catalysts were obtained by calcination of the precursors in static air at a range of temperatures (250-500° C.) for 2 h with a heating rate of 20° C. min$^{-1}$. The FT-IR spectra of the final catalyst calcined at 300° C. were characteristic of metal oxides as shown in FIG. 6.

Influence of Different Calcination Temperatures

Figure 7:
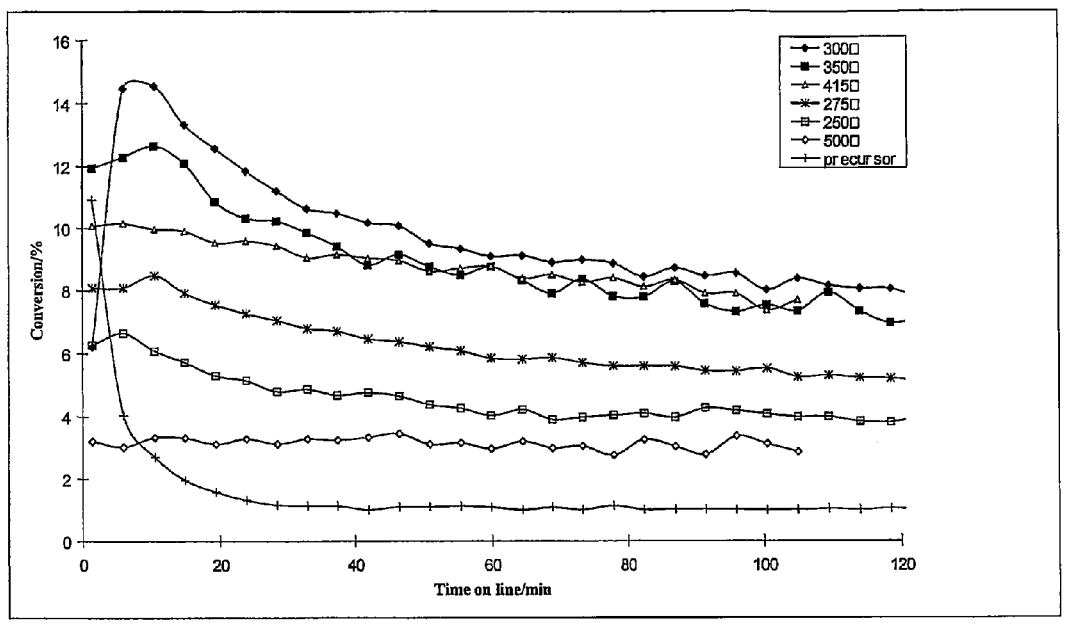
FIG. 7 shows catalytic performances of the catalysts obtained from calcination at different temperatures.
Figure 8:
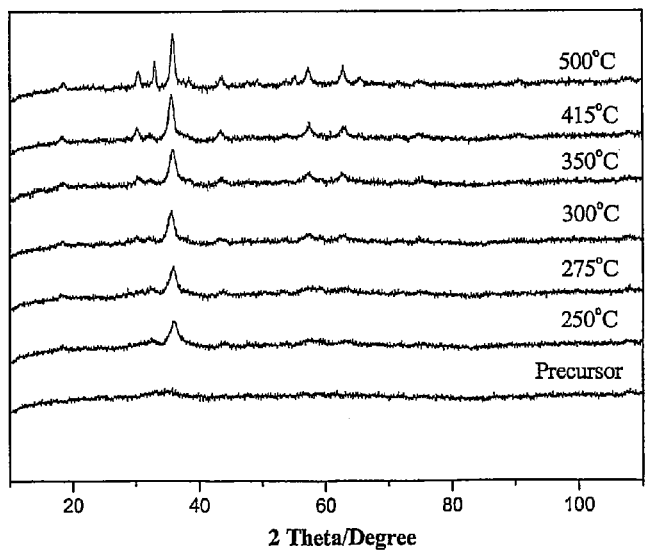
FIG. 8 shows XRD patterns of the catalysts calcined at different temperatures.

The influence of different calcination temperatures on catalytic activity was investigated and it was observed that the optimum calcination temperature is ca. 300° C., for optimum catalyst performance in the oxidation of carbon monoxide to carbon dioxide. Catalytic performances are shown in FIG. 7. From the XRD analysis results of catalysts calcined at different temperatures as shown in FIG. 8, the catalysts showed some crystallinity after calcination in static air, even at low calcination temperatures (250° C.). Moreover, the crystallinity of the material increased with increasing calcination temperature.

Catalyst Structure

The catalysts were characterised by powder X-ray diffraction using an Enraf Nonius PSD120 diffractometer with a monochromatic CuK source operated at 40 keV and 30 mA. Surface areas of the catalysts were determined by multipoint nitrogen adsorption at −196° C. and data were treated in accordance with the BET method S. Brunauer et al, J. Am. Chem. Soc., 1938, 60 pp 309-319. Copper and manganese element ratios were determined using a Varian 55B atomic absorption spectroscopy. FT-IR spectra were recorded on a Perkin Elmer series 2000 FT-IR spectrometer. Samples for STEM and HREM examination were prepared by dispersing the catalyst powder in high purity ethanol, then allowing a drop of the suspension to evaporate on a holey carbon microscope grid. Lattice imaging experiments were carried out on a JEOL 2000EX high-resolution electron microscope operating at 200 kV. Samples were also subjected to chemical microanalysis in a VG systems HB601 UX scanning transmission electron microscope operating at 100 kV. This microscope was fitted with an Oxford Instruments INCA TEM 300 system for energy dispersive X-ray (EDS) analysis.

The catalysts were tested for CO oxidation using a fixed-bed laboratory microreactor, operated at atmospheric pressure. Typically CO (0.5% CO in synthetic air) were fed to the reactor at controlled rates of 22.5 ml min$^{-1}$ using mass flow controllers and passed over the catalyst (50 mg). The catalyst temperature was maintained at 25° C. by immersing the quartz bed in a thermostatically controlled water bath. The products were analyzed using on-line gas chromatography with a 1.5 m packed carbosieve column. The conditions are equivalent to a total gas hourly space velocity of 17000 h$^{-1}$ and a CO concentration of 0.45 mol %.

Figure 9:
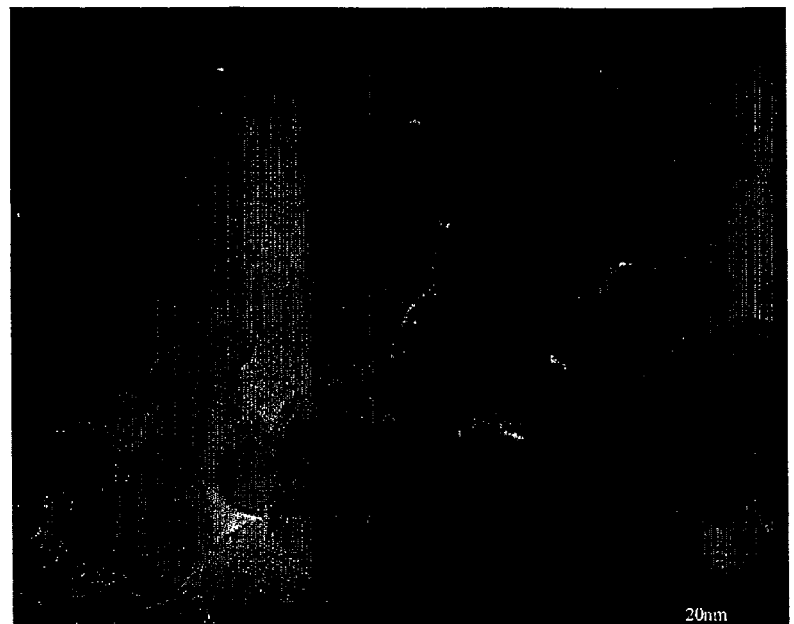
FIG. 9 shows TEM images of the catalyst calcined 300° C., prepared using DMSO as solvent, in which (a) shows crystallised Cu/MnO$_x$ particles formed during calcination of the precursor, Cu particles appearing circular/spherical whereas the MnO$_x$ particles appear rectangular.
Figure 9:
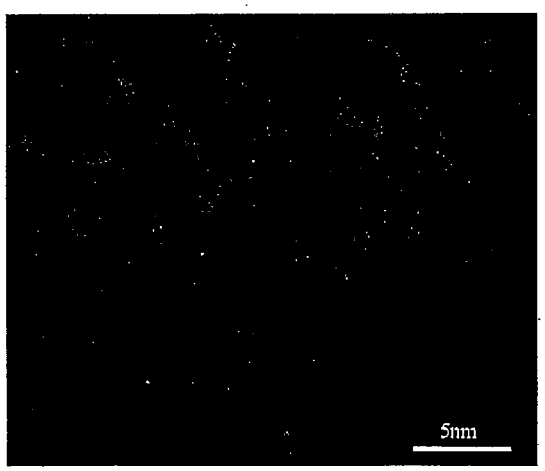
Figure 9:
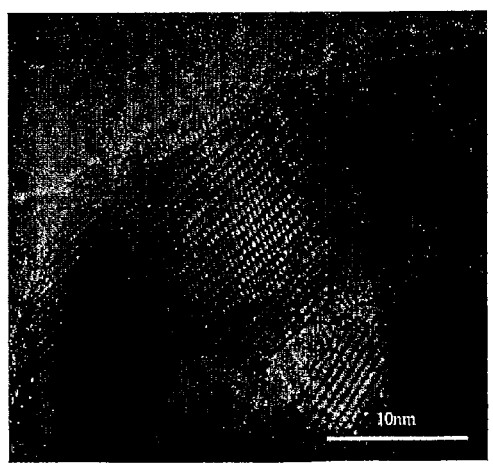

The TEM images of the catalyst calcined at 300° C. are shown in FIG. 9. Following calcination the material remains agglomerated and only a few single particles are observed. However, the particle size of the material is in the range of 10 to 20 nm with the larger particles visible in the precursor no longer apparent. This overall particle shrinkage is consistent with the loss of carbonaceous matter on annealing. These observations demonstrate that calcination does not induce grain growth as the thermal input is insufficient to drive long-range mass transport. Importantly, the observation of regular contrast in the HRTEM images indicates that the material is now crystalline and qualitatively different from the amorphous precursor. The material appears to remain homogeneous. However, detailed examination with the higher spatial resolution of the STEM as shown in FIG. 10, reveals that there has been a transition to a nanoscale phase-separated material where the distribution of Cu and Mn differs across the assembly. Due to the aggregated nature of the nanoparticles it is difficult to analyse single particles but, by comparison of the elemental maps from the STEM of FIG. 10, it is apparent that calcination produces a phase-separated material consisting of intimately mixed nanoparticles of copper and manganese oxide. The differences from the element maps for the precursor are striking—although the particle sizes are not significantly changed by calcination, atomic mobility is sufficient to permit the formation of two distinct metallic and metal oxide phases. Thus, discrete spherical Cu particles can be seen clearly from the HR-TEM image of FIG. 9b and rectangular MnO$_x$ particles can be seen in FIG. 9c. Of particular importance is the observation that the catalysts treated at 300° C. do not contain any CuMn$_2$O$_4$ or similar ternary oxide phases associated previously with active hopcalite catalysts, yet still exhibit high activity for CO oxidation.

Comparison

In order to compare specific catalytic activities, a calcined catalyst according to the invention was tested against currently available hopcalites, both a commercial catalyst (obtained from Molecular Products Company) and a catalyst prepared by conventional coprecipitation, and against a catalytic precursor from the supercritical antisolvent process. The data presented in FIG. 11 are normalized for surface area, which was 117 m$^2$ g$^{-1}$ for the conventional catalyst, 164 m$^2$ g$^{-1}$ for the commercial catalyst and 10 m$^2$ g$^{-1}$ for the (Cu/MnO$_x$)$_{sc}$. Reaction conditions are temperature 25° C., 0.5 vol % CO in air, flow rate 17000 ml gas/ml cat-h. It is clear that the catalyst according to the invention prepared using supercritical antisolvent precipitation demonstrated the highest catalytic activity and this was about twice as high compared to the conventionally prepared sample and the commercial catalyst. This enhanced catalytic activity is ascribed to the nanocrystalline nature of the calcined materials which brings the active components together without even requiring them to be present in the same phase. The results clearly show that a catalyst with enhanced activity can be prepared without the presence of intimately mixed copper and manganese oxide components. It is suggested that it is the precise spatial and orientational relationship between the metal and metal oxide particles which will control the catalytic activity of this class of nanoscale phase-separated catalysts.

The following experimental results relate to the preparation of catalyst precursors from ethanol solutions optionally including water, and to catalysts prepared therefrom.

1 Precursors

The syntheses of precursors of hopcalite are performed as previously described. The whole system is held at 40° C. and 110 bar. Supercritical CO$_2$ and the mixed solution (copper acetate (5 mg/ml) and manganese acetate (12.25 mg/ml)) are pumped into the system with the flow rate of 7 ml/min and 0.1 ml/min, respectively. The metal salts were made as solutions in ethanol.

To investigate the effect of water as a cosolvent, different amounts of water were added to the ethanol from 0 to 100 vol %. Experimental results show that no precipitates can be achieved when there is more than 25% water in ethanol.

1-1 BET Surface Area

Four precursors can be obtained and their surface areas decrease with the addition of more water in ethanol.

| Precursor | Solvent | Precipitates | surface area(m$^2$/g) |
|---|---|---|---|
| a | 0% H$_2$O | green | 264 |
| b | 5% H$_2$O | dry ↓ powder | 200 |
| c | 10% H$_2$O | yellow (not quite dry) | 152 |
| d | 15% H$_2$O |  | 140 |
| — | 25% H$_2$O | wet precipitates | — |
| — | 50% H$_2$O | No dry products | — |
| — | 100% H$_2$O | No product | — |

As shown in FIG. 12, from XRD analysis the material obtained is amorphous by X-ray diffraction in the absence of water. The precursors which are obtained from the solutions containing water, i.e. 5%, 10% and 15%, show crystalline Mn(CO$_3$)$_2$. In addition, with the increase of water content in ethanol, the crystallinity of the materials increases.

As shown in FIG. 13, IR spectra are in agreement with the results of XRD determination. The precursor obtained in the absence of water (a) exhibits bands of the acetate salts, with main bands at 1561 and 1418 cm$^{-1}$, indicating the presence of acetates when using pure ethanol as a solvent. As water is added, the bands associated with carbonate species start to appear until almost complete carbonates are observed when using 15% H$_2$O/85% ethanol as solvent.

The SEM images of FIG. 15 indicate that the precursors, prepared from water-contained ethanol, form cauliflower-like structures.

For preparation of catalysts, the above-mentioned precursors were calcined at 300° C. for 2 h and 20 h with the ramp of 10° C./min in static air.

Following the calcination, the BET surface areas of the catalysts are very different.

| as-calcined Catalysts | a-2 h | a-20 h | b-2 h | b-20 h | c-2 h | c-20 h | d-2 h | d-20 h |
|---|---|---|---|---|---|---|---|---|
| Surface areas(m$^2$/g) | 33 | 20 | 65 | 83 | 136 | 142 | 175 | 179 |

As shown in FIG. 19, the XRD patterns of the catalysts show that the amorphous precursor (a) crystallises on calcination, while the more crystalline the precursor appeared the more amorphous the calcined catalyst is. The XRD patterns of crystalline materials show the diffraction lines of $CuMn_2O_4$.

FIG. 20 shows SEM images of catalysts (b) and (c) and indicates that the morphology of the precursors is retained in the final catalysts.

The activity of the catalysts for CO oxidation at ambient temperature, as shown in FIG. 21, was tested using a fixed-bed laboratory microreactor. Catalyst c shows excellent catalytic activities. The results indicate that better catalysts can be obtained when water-containing ethanol is applied as a solvent of metal acetates.

It has additionally been found that addition of 1% gold by weight to the catalyst results in a doubling of the activity for CO oxidation with no determental effect on catalyst lifetime.

The effect of water as a co-solvent with DMF was investigated under the same conditions as for water/ethanol.

| | | | | surface area(m$^2$/g) | |
|---|---|---|---|---|---|
| Precursor | Solvent | Precipitates | Precursor | Calcined 300° C., 2 h | Calcined 300° C., 20 h |
| a' | 0% H$_2$O | Brown powders | 241 | 21 | 20 |
| b' | 5% H$_2$O | | 242 | 70 | 95 |
| c' | 10% H$_2$O | | 113 | 222 | 206 |
| d' | 15% H$_2$O | | 106 | 210 | ~210 |

As shown in FIG. 22, the precursor prepared from pure DMF shows the similar IR spectrum to that of the precursor prepared from pure ethanol (FIG. 18) which exhibits bands of the acetate salts, with main bands at 1561 and 1418 cm$^{-1}$, indicating the presence of acetates. As water is added the bands associated with carbonate species start to appear until almost complete carbonates are observed when using 15% H$_2$O/85% DMF as solvent.

From the activity graphs shown in FIG. 23, it can be seen that the presence of water enhances the activity compared with pure DMF but that the initially-high activity of catalysts obtained from 5% and 10% water was not as consistent as for ethanol/water co-solvents.

It appears that, when water is added to the precursor solution there is a reaction between the acetate salts of the metals, $CO_2$, and $H_2O$, whereby carbonates of the metals are precipitated instead of acetate compounds.

From the XRD patterns and Raman spectra it can be seen that adding more water increases the carbonate formation until at 15% water the precipitated material appears to be completely carbonates.

Although the acetate materials (a) have a higher surface area, when they are calcined to form the mixed oxide catalyst the surface area collapses to give low surface area materials.

The carbonate materials (d) retain their surface area and for the 100% carbonate material the surface area actually increases.

The samples that are in between these two extremes (b and c) are seen to be mixtures of carbonate and acetates and have surface areas between the 100% acetates and 100% carbonate materials.

The materials derived from the carbonates have a much better activity for CO oxidation than the acetates-derived samples.

The invention claimed is:

1. A method of preparing a mixed-metal oxide comprising the steps:
   a) preparing a solution of a mixture of metal precursor compounds in a solvent;
   b) contacting the solution with a supercritical antisolvent to precipitate a mixed-metal oxide precursor, wherein the mixed-metal oxide precursor is insoluble in the antisolvent and the solvent and the antisolvent are miscible; and
   c) oxidizing the precipitated mixed-metal oxide precursor to form the mixed-metal oxide.

2. The method according to claim 1, including the further step of activating the mixed-metal oxide for use as a catalyst.

3. The method according to claim 1, in which the mixture of metal precursor compounds comprises a mixture of salts of the metals having the same counter-ion selected from acetate, formate, citrate, nitrate or chloride.

4. The method according to claim 1, in which the supercritical antisolvent comprises $CO_2$.

5. The method according to claim 1, in which the solvent comprises a polar solvent, optionally including water.

6. The method according to claim 5, in which the polar solvent comprises DMF, DMSO or an alcohol.

7. The method according to claim 1, in which the mixed-metal oxide precursor comprises a copper-manganese oxide precursor.

8. The method according to claim 7, in which the mixture of metal precursor compounds comprises copper acetate and manganese acetate.

9. The method according to claim 1, in which the solvent comprises up to 20% water based on the total solvent.

10. The method according to claim 4, in which the $CO_2$ is pressurized at pressures up to 110 bar.

* * * * *